United States Patent
Choi

(10) Patent No.: US 9,647,964 B2
(45) Date of Patent: May 9, 2017

(54) METHOD AND APPARATUS FOR MANAGING MESSAGE, AND METHOD AND APPARATUS FOR TRANSMITTING MESSAGE IN ELECTRONIC DEVICE

(71) Applicant: Samsung Electronics Co., Ltd., Gyeonggi-do (KR)

(72) Inventor: Young-Keun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 348 days.

(21) Appl. No.: 14/074,999

(22) Filed: Nov. 8, 2013

(65) Prior Publication Data
US 2014/0136989 A1 May 15, 2014

(30) Foreign Application Priority Data
Nov. 12, 2012 (KR) .................. 10-2012-0127423

(51) Int. Cl.
| | | |
|---|---|---|
| G06F 3/048 | (2013.01) | |
| H04L 12/58 | (2006.01) | |
| H04M 1/725 | (2006.01) | |
| G06F 3/0485 | (2013.01) | |
| G06F 3/0488 | (2013.01) | |
| G06F 3/01 | (2006.01) | |
| G06F 3/0482 | (2013.01) | |

(52) U.S. Cl.
CPC ............ *H04L 51/04* (2013.01); *G06F 3/0485* (2013.01); *H04M 1/72552* (2013.01); *G06F 3/017* (2013.01); *G06F 3/0482* (2013.01); *G06F 3/04883* (2013.01); *H04L 12/581* (2013.01)

(58) Field of Classification Search
USPC .................... 715/752, 713, 863, 786
See application file for complete search history.

(56) References Cited

U.S. PATENT DOCUMENTS

2008/0248839 A1* 10/2008 Zinn ................ G06F 3/0482
455/566
2010/0026647 A1* 2/2010 Abe ................. G06F 3/04883
345/173
(Continued)

FOREIGN PATENT DOCUMENTS

| KR | 10-2010-0051895 A | 5/2010 |
|---|---|---|
| KR | 10-2012-0120630 A | 11/2012 |
| WO | 2012/118591 A1 | 9/2012 |

OTHER PUBLICATIONS

Maggie Morrison, Voice and data traffic on road to unified messaging, Dec. 6, 1999, Newquest Ltd, pp. 1-3.*
(Continued)

*Primary Examiner* — Linh K Pham
*Assistant Examiner* — Tam Tran
(74) *Attorney, Agent, or Firm* — Cha & Reiter, LLC

(57) ABSTRACT

A method usable by an electronic device displays in display image, content of a plurality of transmitted and received conversation messages. In an aspect, the messages may be displayed for an individual date, sequentially collated by date and time. In response to at least one detected touch on a touch screen, the method may compress at least one of (a) the transmitted or (b) received, conversation messages and displays an image element representing at least one of the compressed conversation messages.

16 Claims, 20 Drawing Sheets

(56) References Cited

U.S. PATENT DOCUMENTS

| | | | |
|---|---|---|---|
| 2010/0088641 A1* | 4/2010 | Choi ..................... | G06F 3/0482 |
| | | | 715/828 |
| 2010/0217808 A1 | 8/2010 | Benninger | |
| 2010/0279741 A1 | 11/2010 | Park | |
| 2010/0332518 A1* | 12/2010 | Song ..................... | G06F 3/0483 |
| | | | 707/769 |
| 2012/0131508 A1* | 5/2012 | Lee ...................... | G06F 3/0482 |
| | | | 715/835 |
| 2012/0215866 A1* | 8/2012 | Satterfield ............ | G06Q 10/107 |
| | | | 709/206 |
| 2013/0145321 A1* | 6/2013 | Horiuchi ............... | G06F 3/0483 |
| | | | 715/830 |

OTHER PUBLICATIONS

Tim McCollum et al., Networking News on Office Equipment, May 1999, Nation's Business, pp. 1-15.*
Australian Search Report, Dated: Nov. 17, 2016.

* cited by examiner

METHOD AND APPARATUS FOR MANAGING MESSAGE, AND METHOD AND APPARATUS FOR TRANSMITTING MESSAGE IN ELECTRONIC DEVICE

CLAIM OF PRIORITY

This application claims the benefit of priority under 35 U.S.C. §119(a) from a Korean patent application filed in the Korean Intellectual Property Office on Nov. 12, 2012 and assigned Serial No. 10-2012-0127423, the entire disclosure of which is hereby incorporated by reference.

BACKGROUND

1. Technical Field

The present disclosure concerns a system usable by an electronic device for managing a message, and transmitting the message.

2. Description of the Related Art

Known portable terminals including smartphones based on various Operating Systems (OS), employ a message transmission/reception function and different types of message transmission/reception function applications (messaging services such as for text, color mail, mobile messaging, for example).

A user transmits/receives a message via a portable terminal and message content is displayed on a display of the portable terminal. Known smartphones provide a function enabling editing and storing individual messages and use a specific application to display transmitted/received messages based on date to identify time and date of message transmission/reception. FIGS. 1A and 1B show a known message window displayed in the form of a messenger having a dialog window. The portable terminal shows a message in the form of a dialog window for use in managing the messages and a specific application collates messages based on a message transmission/reception date and time 100. Also, individual received messages are stored and transmitted without reprocessing and re-handling. Due to limitation in a display size, a large amount of messages cannot be displayed, and in the case where an additional message is transmitted/received, existing messages may overflow a displayed screen image (such as conversation messages with a specific user) and are accumulated in a stack. Therefore, to view message content of a specific date or conversation content of a specific subject, a scrolling operation as in FIG. 1B is required. In the case of frequent message conversation with a specific user, it is difficult to manage conversation message content and it is difficult to retrieve previous conversation content with a particular user.

SUMMARY

A system usable by an electronic device addresses the identified deficiencies and related problems by collating and storing conversation messages for individual subjects and supports retransmission of messages corresponding to specific conversation content. The system classifies, manages and re-transmits collated individual messages of conversation message content in an electronic device and compresses conversation content of messages displayed on a dialog window using a touch screen and substantially immediately transmits compressed conversation message content to a relevant counterpart user or a specific destination. The system collates conversation messages by conversation subject, and groups (keyword, date, sender/receiver, for example) of a type desired by a user, and provides an edit function in a dialog window to select and manage transmitted/received messages. The system links an application to a message in response to a characteristic of a transmitted/received message.

A method usable by an electronic device comprises displays, in a single display image, content of a plurality of transmitted and received conversation messages for an individual date, sequentially collated by date and time. In response to at least one detected touch on a touch screen, compressing at least one of, (a) the transmitted and (b) received, conversation messages. An image element is displayed representing at least one of the compressed conversation messages.

In an aspect, the image element is displayed in the single display image wherein the content of a plurality of transmitted and received conversation messages concern a single subject. The at least one detected touch for compressing the conversation messages comprises detecting a first touch for a first message of the plurality of conversation messages and detecting a second touch corresponding to a second message of the plurality of conversation messages. The second message is retrieved by scrolling in response to the second touch. The conversation messages are compressed in response to the at least one detected touch by compressing conversation messages between a first message corresponding to a first touch and a second message corresponding to a second touch. The method detects the at least one detected touch by detecting a touch of an object corresponding to a specific date and compresses conversation messages transmitted or received on a touched specific date.

In an aspect, the method detects the at least one detected touch for compressing the conversation messages by detecting a first touch of an object corresponding to a first specific date and detecting a second touch of an object corresponding to a second specific date. The object corresponding to the second specific date is retrieved via scrolling in response to the second touch. Conversation messages are compressed for each date between an object corresponding to a touched first specific date and an object corresponding to a second specific date. The compressed conversation messages are represented by overlapped image elements displayed in a form of an icon indicating the conversation messages are compressed. Information regarding the compressed conversation messages is displayed and comprises one of a specific date, a transmission or reception time of a conversation message, a portion of content or entire content of a first message and a title input by a user.

In a further aspect, a method usable by an electronic device displays image elements representing a plurality of compressed transmitted and received conversation messages for an individual date, sequentially collated by date and time. A gesture is detected selecting one compressed conversation message of the plurality of compressed conversation messages via a displayed image element. Messages including the selected one compressed conversation message are transmitted to a destination associated with a source of a received conversation message in response to the detected gesture comprising an operation for touching the one compressed conversation message, or an operation for selecting and moving the one compressed conversation message to a specific region. The specific region is a region partitioned with reference to a vertical axis.

In another aspect, a method manages a message in an electronic device by displaying, in a single display image, content of a plurality of transmitted and received conversation messages sequentially collated by date and time. Text matching content of at least one message of the plurality of conversation messages with predetermined words in a database is performed. The method displays a division line in the single display image dividing the image into at least two areas and partitions image elements representing the conversation messages for presentation in an area of the at least two areas selected in response to the text matching. The words in the database data comprise a specific phrase, a word defined in advance, or data associated with a specific conversation message.

In yet another aspect one text matched message is selected and the method determines whether messages preceding or subsequent to a respective associated transmission or reception time correspond to specific conversation content of the selected one message. A message corresponding to a start of the specific conversation content is selected and a line displayed representing the message corresponding to the start of the specific conversation content. Also a division line is displayed for dividing the messages comprising a mark representing a start message of specific conversation content and the line divides the plurality of conversation messages in a form of at least one page. The page is determined in response to content of a message between a start time point and an end time point of message transmission or reception, or determined depending on a point at which a message transmission or reception event does not occur for a predetermined time. At least one message is selected and moved to a message group corresponding to a partitioned specific subject and linked to another application.

In a further aspect, a method processes a message for use by an electronic device by partitioning and displaying image elements representing a plurality of compressed transmitted and received conversation messages in respective areas within at least one displayed image page. A gesture is detected using a touch screen displaying a page comprising an image element representing one conversation message of the plurality of conversation messages. The one conversation message is transmitted to a destination associated with a source of a received conversation message in response to the detected gesture. The plurality of compressed conversation messages are displayed using a division line representing a start message of specific conversation content, and displaying information regarding the partitioned messages. A touch of an object corresponding to the information regarding the partitioned messages is detected and the partitioned messages are transmitted in response to the touch. Information regarding the partitioned messages comprises a short cut icon corresponding to the partitioned messages and a conversation title and the gesture is a gesture operation of turning a page, and including outputting a sound effect of turning a page.

In another aspect an electronic device comprises a touch screen, one or more processors, a memory and one or more programs stored in the memory and configured for execution by the one or more processors, The program comprises instruction executable for, listing and displaying content of a plurality of transmitted and received conversation messages for an individual date, sequentially collated by date and time; detecting at least one touch via a touch screen; and compressing the conversation messages in response to the detected at least one touch. The instructions comprise instructions for detecting a first touch of a first message of the plurality of conversation messages, and detecting a second touch corresponding to a second message of the plurality of conversation messages. The second message is retrieved via scrolling in response to the second touch. The instruction for compressing the conversation messages in response to the at least one touch comprises an instruction for compressing conversation messages for each date between an object corresponding to a touched first specific date and an object corresponding to a second specific date. The compressed conversation messages are represented by overlapped image elements indicating compressed conversation messages.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist a person or ordinary skill in the art in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Hereinafter, description is made on a method and an apparatus for managing a message, and a method and an apparatus for transmitting a message in an electronic device.

A system compresses and re-transmits a transmitted/received message by operating in cooperation with other applications including data conversion, data processing, memo applications, for example. As used herein, a gesture comprises forming a touch pattern on a touchscreen. A touch is formed on a touchscreen of an electronic device from the outside by a user's finger or a stylus pen, for example, and a gesture denotes a drag of a predetermined pattern with touch maintained on the touchscreen. A gesture may also denote a drag with a touch maintained and performance of even a release of a touch.

Figures 1A, 1B:
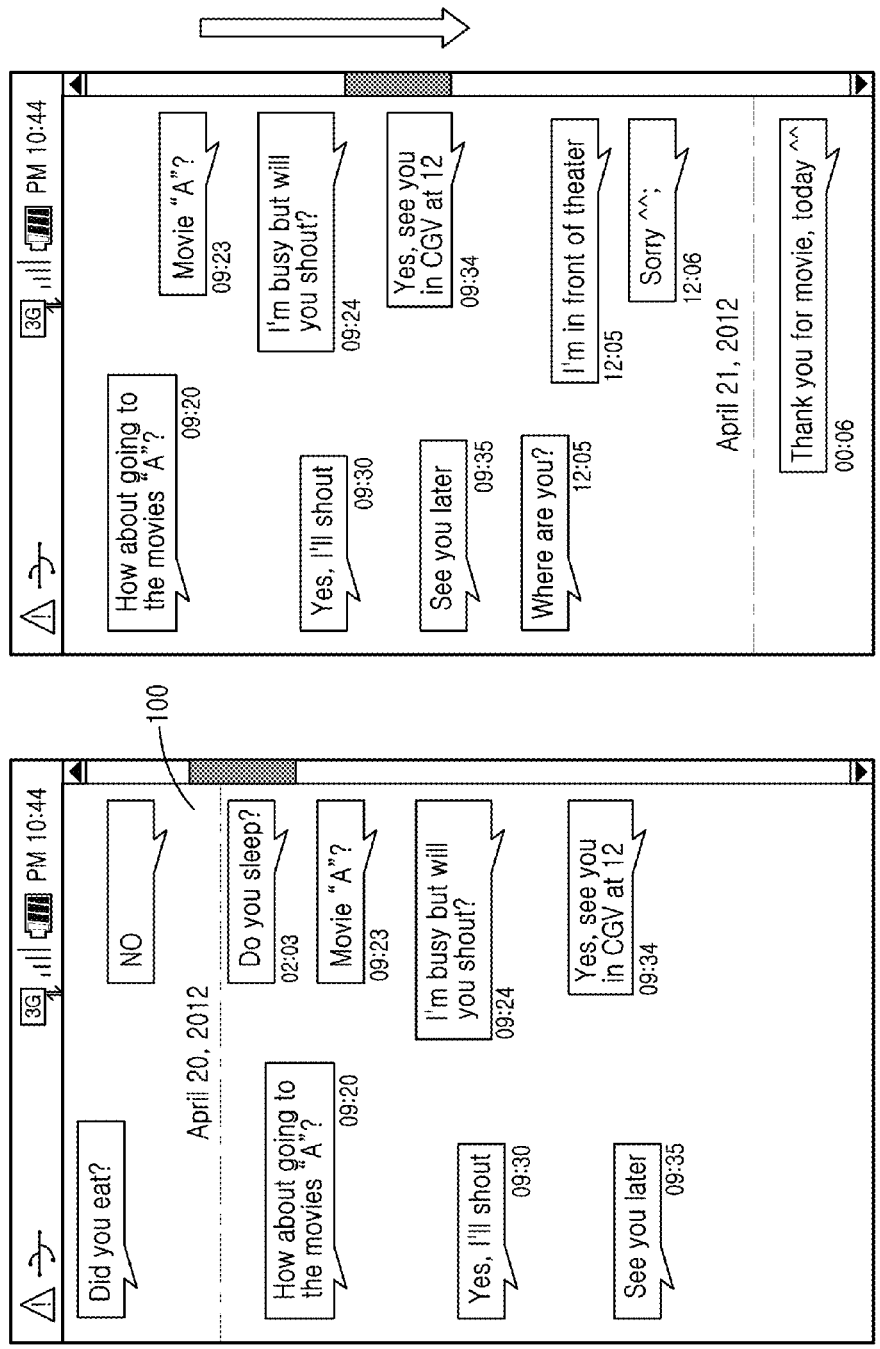
FIGS. 1A and 1B illustrate a known message window.
Figure 2A:
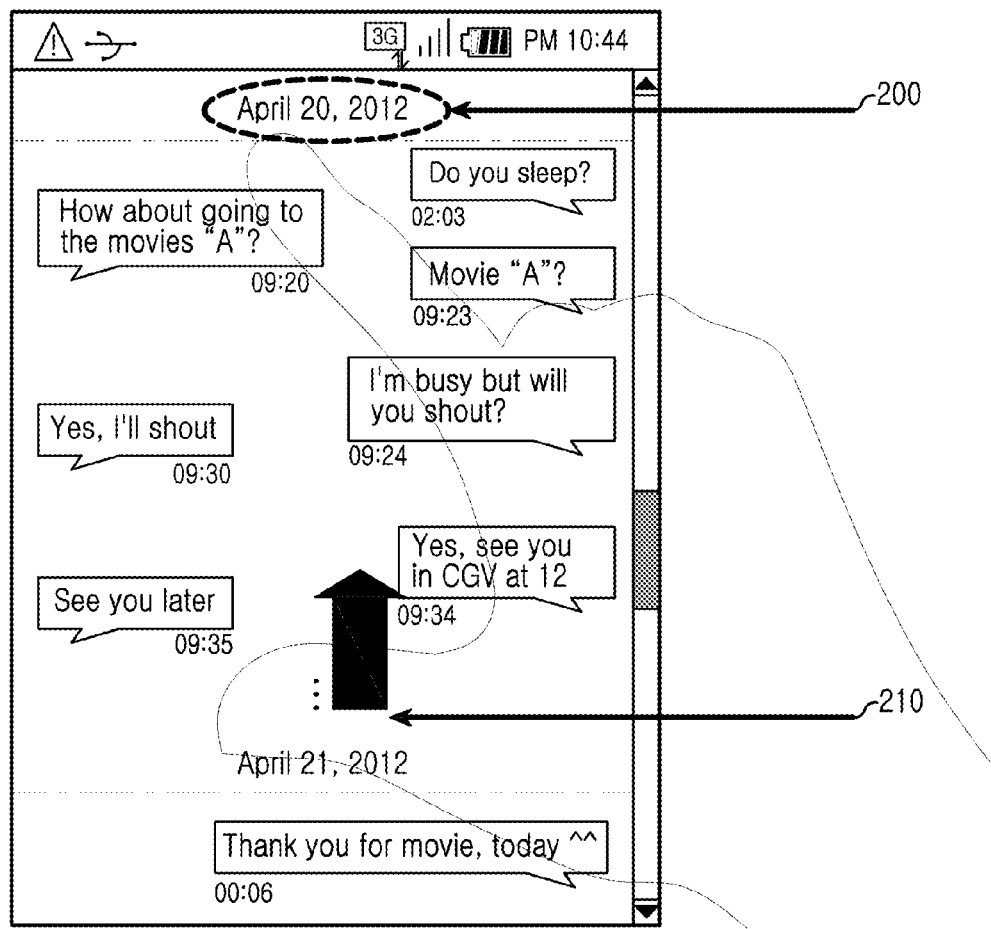
FIGS. 2A and 2B illustrate compressing messages inside a message window and displaying compressed messages according to invention principles.
Figure 2B:
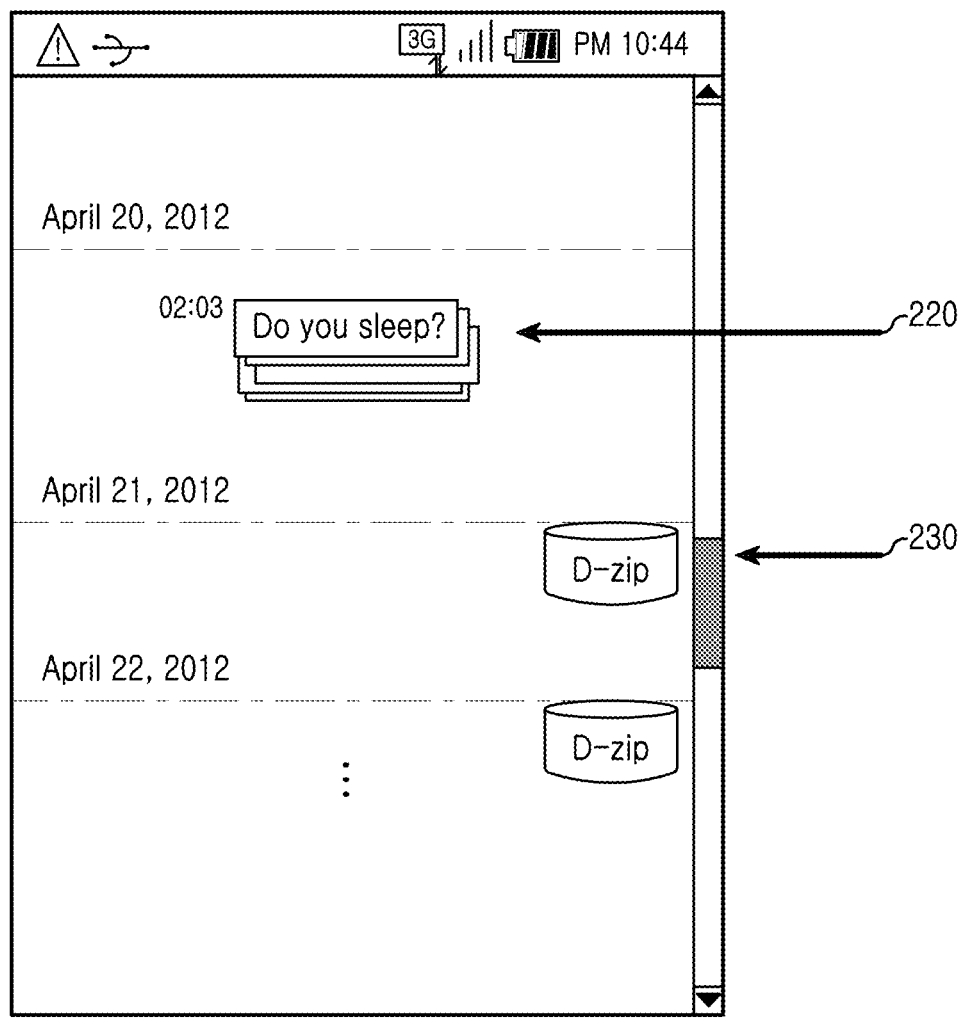

FIGS. 2A and 2B show compressing messages inside a message window and displaying compressed messages. A user manages conversation message content for individual dates using a first touch 200 on the category of date and utilizes a second touch 210 to use scroll. When a finger corresponding to the first touch or the second touch is released from a display, an object corresponding to the first touch is identified and conversation messages of a relevant date are displayed in an overlapping form or displayed in a compressed form as in FIG. 2B. When an object of a relevant date is touched without a scroll operation, conversation messages of the relevant date are compressed and displayed. When touched, conversation messages of a relevant date are displayed in an overlapping form (220) or compressed by a compressing algorithm and displayed as an icon (230). In compressing a list for each date, a scroll operation is performed and concurrently a shape in which compression is performed is shown in real-time. For example, a user touches a date of Apr. 20, 2012 with a first finger and sequentially scrolls conversation messages transmitted/received on Apr. 21, 2012 and Apr. 22, 2012 using a second finger and compression is automatically performed for each date.

Figure 3:
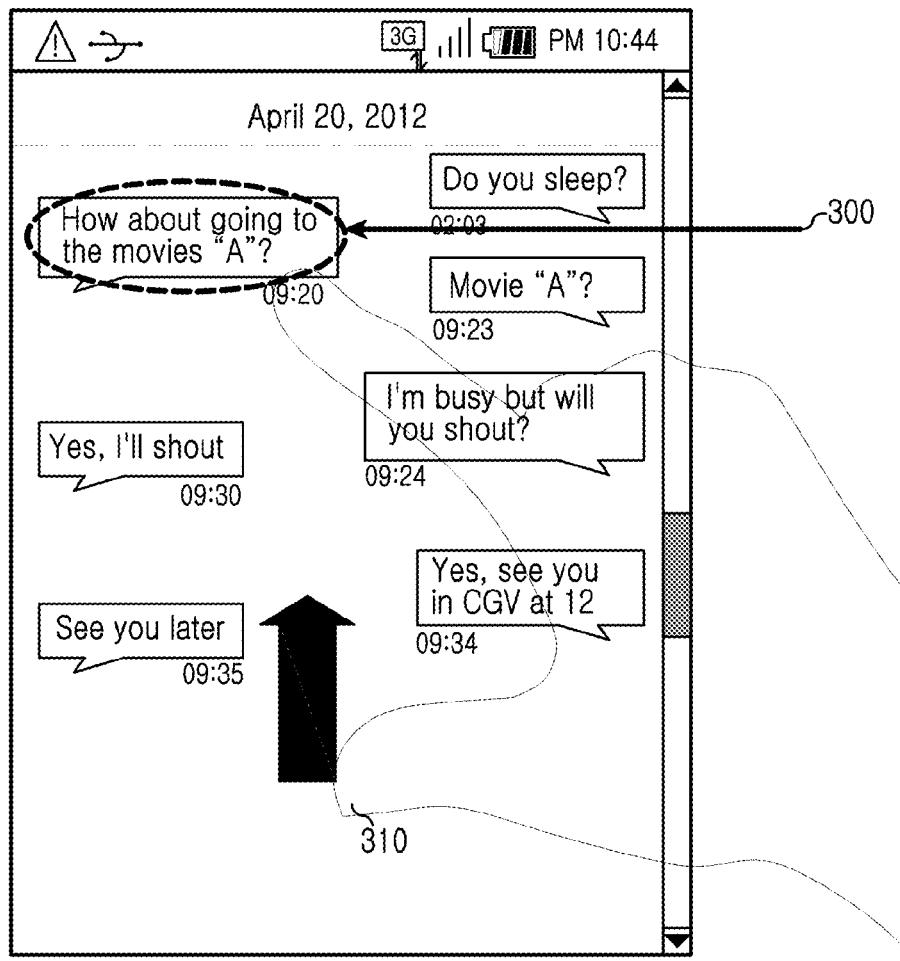
FIG. 3 shows compressing messages inside a message window according to invention principles.
Figure 4:
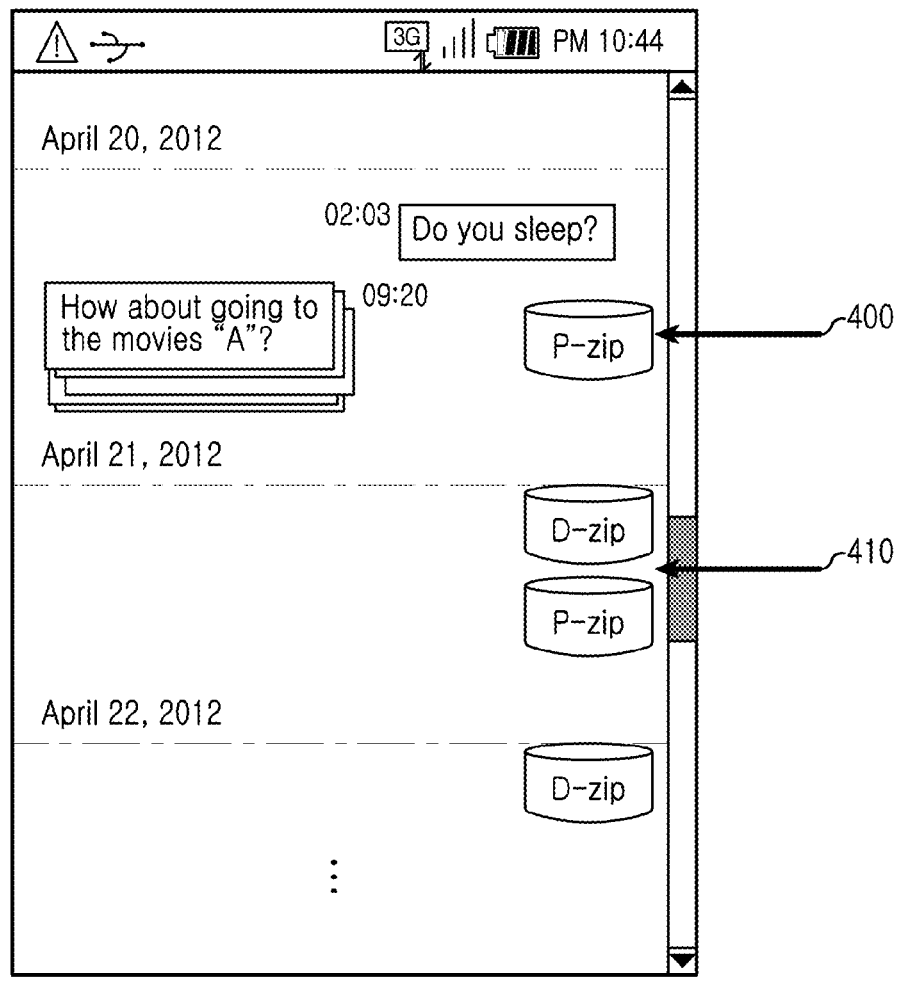
FIG. 4 shows displaying compressed messages inside a message window according to invention principles.

FIG. 3 shows compressing messages inside a message window. A user manages conversation content for each specific subject, the user touches (300) a specific conversation message, scrolls (310) up to a portion where conversation content of a relevant subject ends, and performs compression on selected conversation messages when at least one finger is removed. At this point, content of conversation messages is determined and titles corresponding to conversation subjects of various types such as a promise, a conference, a schedule, a gossip, for example, or icons corresponding thereto are automatically inserted as illustrated in FIG. 4. Depending on implementation, conversation messages corresponding to a specific subject are displayed in an overlapping form. A title or an icon corresponding thereto is determined by user input.

FIG. 4 shows displaying compressed messages inside a message window. Messages corresponding to specific conversation content are represented in an overlapping form or displayed in a compressed form via a multi-touch (400). Also, individual subject compression content may be subordinate to content of another date and is managed separately depending on user request (410). Alternatively, individual subject compression content is collated and displayed in a page form as illustrated in FIGS. 9 to 12.

Figure 5:
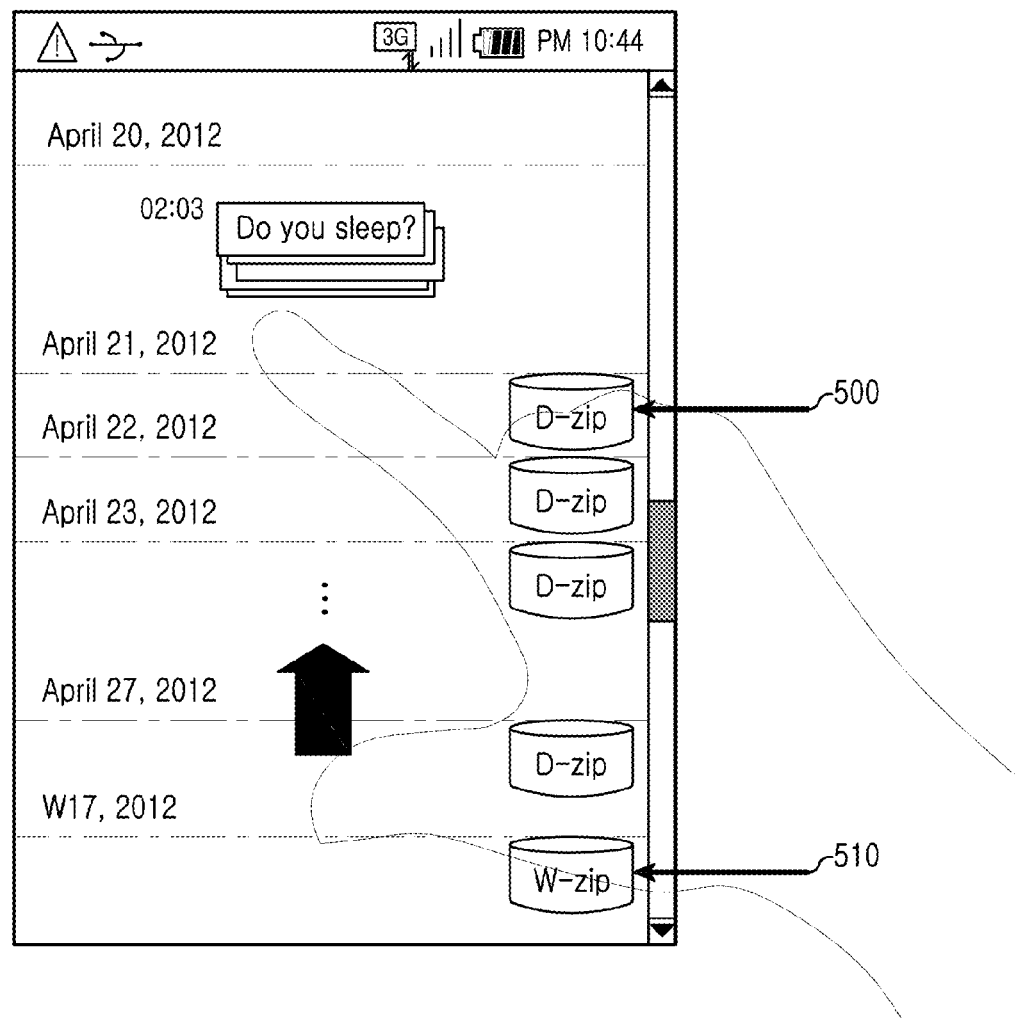
FIG. 5 shows compressing messages inside a message window according to invention principles.
Figure 6A:
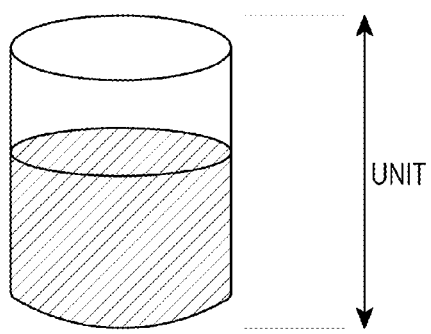
FIGS. 6A and 6B show displaying a compression ratio according to invention principles.
Figure 6B:
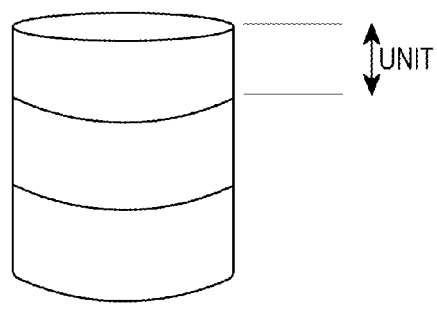

FIG. 5 shows compressing messages inside a message window. A category is applied to content compressed and managed for each subject and date, to support additional compression management. For example, when a start date is selected and scrolling is performed up to a destination date with respect to conversation messages compressed and managed for each date (500), compression management of weekend messages is possible (510). Likewise, management for each year is allowed. Also, in a method for exhibiting content of compression, a compression ratio of a maximum capacity set by a user is shown as illustrated in FIG. 6A. Alternatively, a user configures compression in advance for partitioned compression as illustrated in FIG. 6B. FIG. 6 shows displaying a compression ratio.

Figure 7:
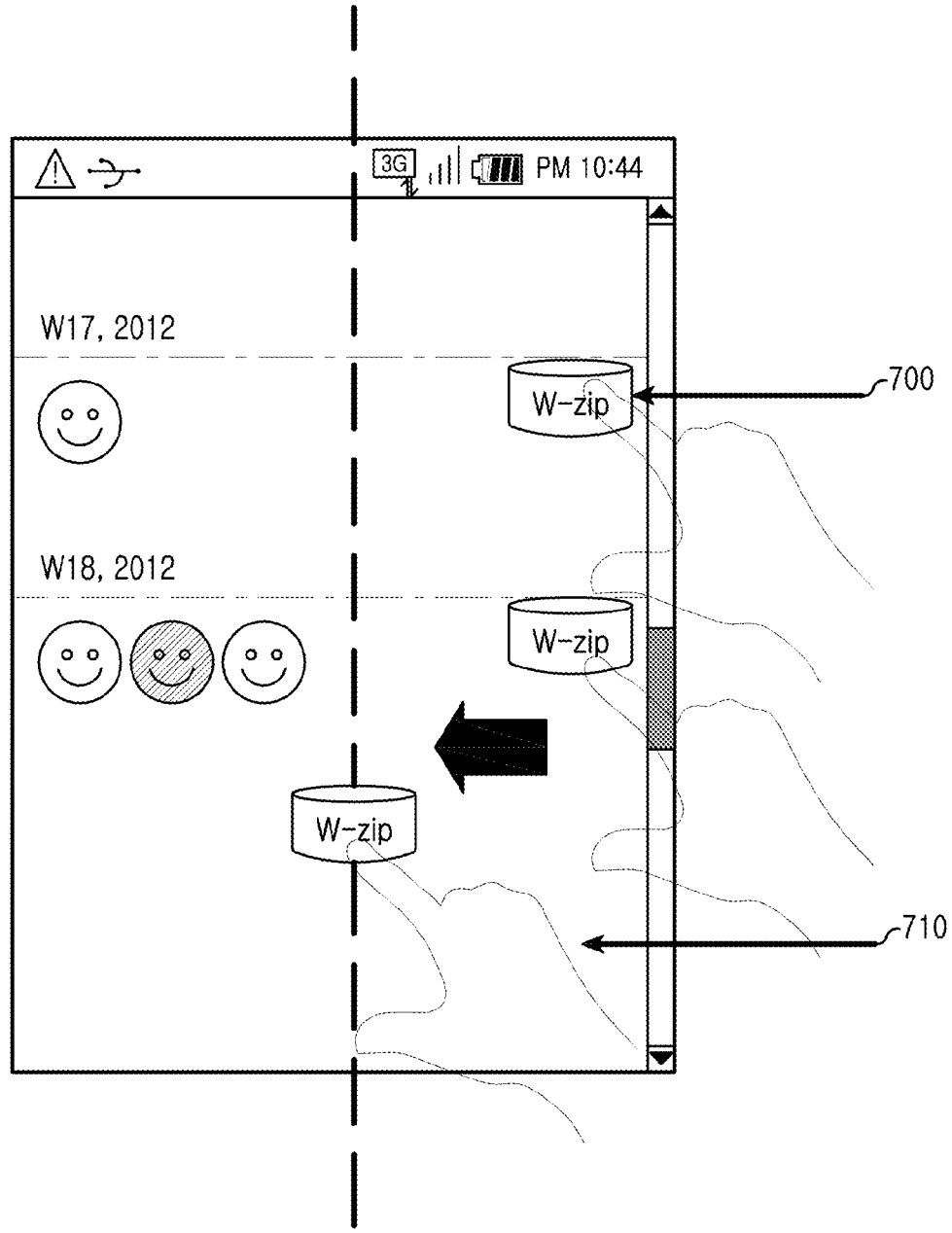
FIG. 7 shows transmitting compressed messages inside a message window according to invention principles.

FIG. 7 shows transmitting compressed messages inside a message window in response to a user gesture. For example, in the case where a user touches an icon corresponding to compressed conversation messages, the messages are automatically transmitted to a specific user or a transmission destination in response to user predetermined configured preferences (700). Alternatively, in case of conversation content with a plurality of specific destinations, a user transmits the content by touching and dragging compressed content to a virtual display vertically partitioned portion (710). In an embodiment, when a user drags an icon corresponding to compressed conversation content to an icon representing a message conversation counterpart user on the right, the compressed conversation content is transmitted to an electronic device of the counterpart user. Alternatively, a user gesture such as a drag is employed to transmit compressed conversation content to group conversation counterpart users or a specific conversation counterpart user of the group conversation counterpart users.

Figure 8:
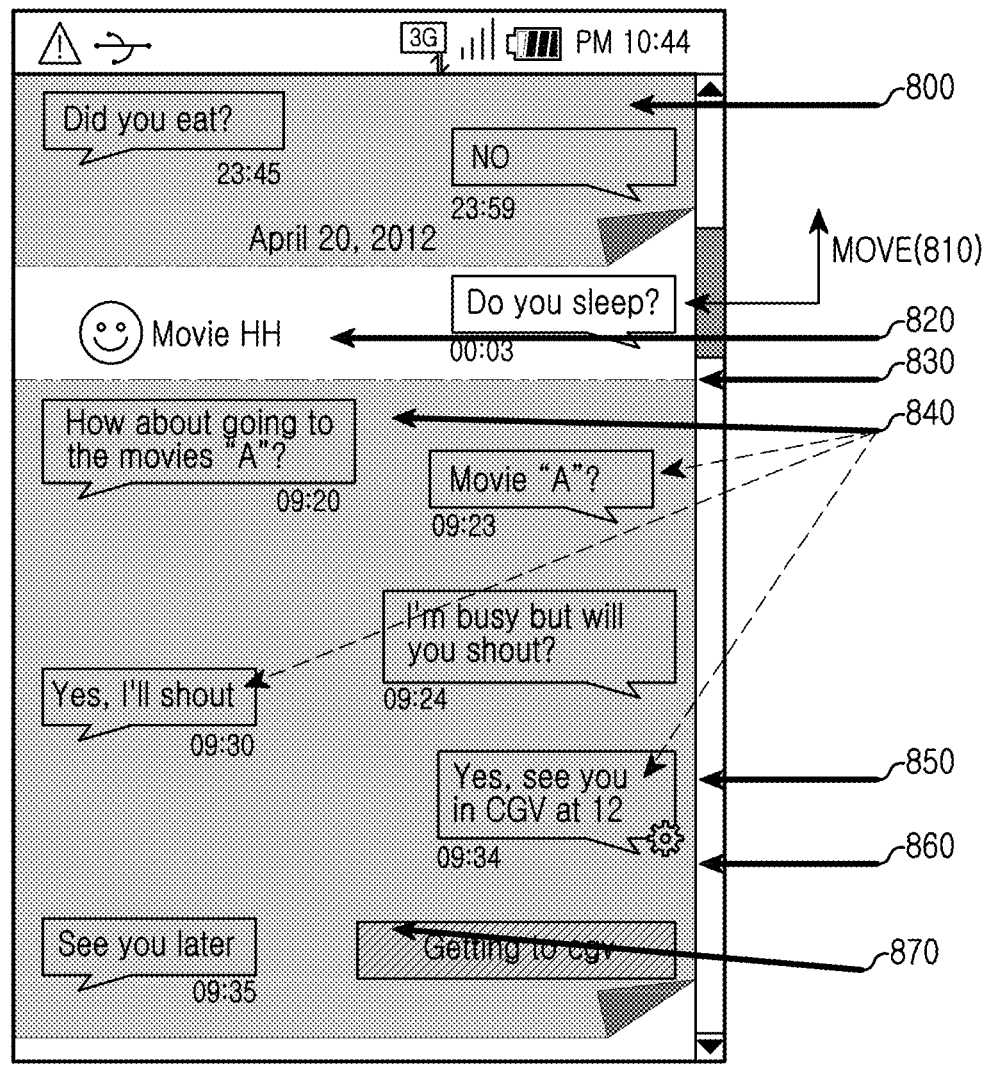
FIG. 8 shows dividing and editing conversation messages inside a message window according to invention principles.

FIG. 8 shows dividing and editing conversation messages inside a message window and an icon representing conversation message content and message transmission/reception. In response to sending and receiving conversation messages, a message section is automatically (or in response to user command) divided (830) based on a predetermined meaningful database data such as a specific phrase and a word or a number, for example. Depending on implementation, the message section may be determined by the user setting. An automatically partitioned message section or message content divided by date or subject by a user is movable to a specific subject group or an arbitrary position (not shown). Similar message content is grouped. Multiple conversation messages are transmitted/received at different times that may be selectively moved to displayed partitions having specific meaning or categories (830).

An arbitrary icon or a character representing specific meaning or category is determinable by a user (820).

If a specific conversation needs to be selected from multiple conversations and stored, a user may select a location of relevant messages or another location to store the conversation (840). The system stores specific conversation message content, determines a word frequently used in conversation content or a word set in advance by a user, retrieves transmitted/received data corresponding to a determined keyword and selects related conversation messages based on transmission/reception time. A user is prompted via a display element whether to store the selected conversation messages. An alarm function is set based on alarm information identified in the content of a transmitted/received message (e.g., set parameters include alarm time, repeating period and frequency of alarm). A user may set alarm setting with reference to content of a transmitted/received message, or the system automatically sets an alarm in response to information extracted from content of a transmitted/received message. If an alarm and a conversation message to utilize as an alarm are selected, it is automatically or manually added as a scheduled alarm. An alarm is set in response to a conversation message related to relevant alarm information and marked with an alarm icon, for example, indicating the alarm setting has been set is (850).

If a memo is required during conversation message transmission/reception, a user executes a memo application to input memo content. The memo contents are represented using an icon representing a memo in the neighborhood of the relevant conversation message (860). The system enables a user to perform a retrieve function using a specific keyword or sentence of a conversation message, and displays an icon representing the retrieve function message (870). A user is enabled to indicate a retrieve function is required during conversation message transmission/reception, and the retrieve function occurs to retrieve display information after the conversation message transmission/reception ends. Data for retrieval is substantially immediately retrieved during conversation message transmission/reception, and the retrieve function is utilized after the conversation message transmission/reception operation ends. The messages processed include short messages and video including a still image and moving image as well audio.

Figure 9:
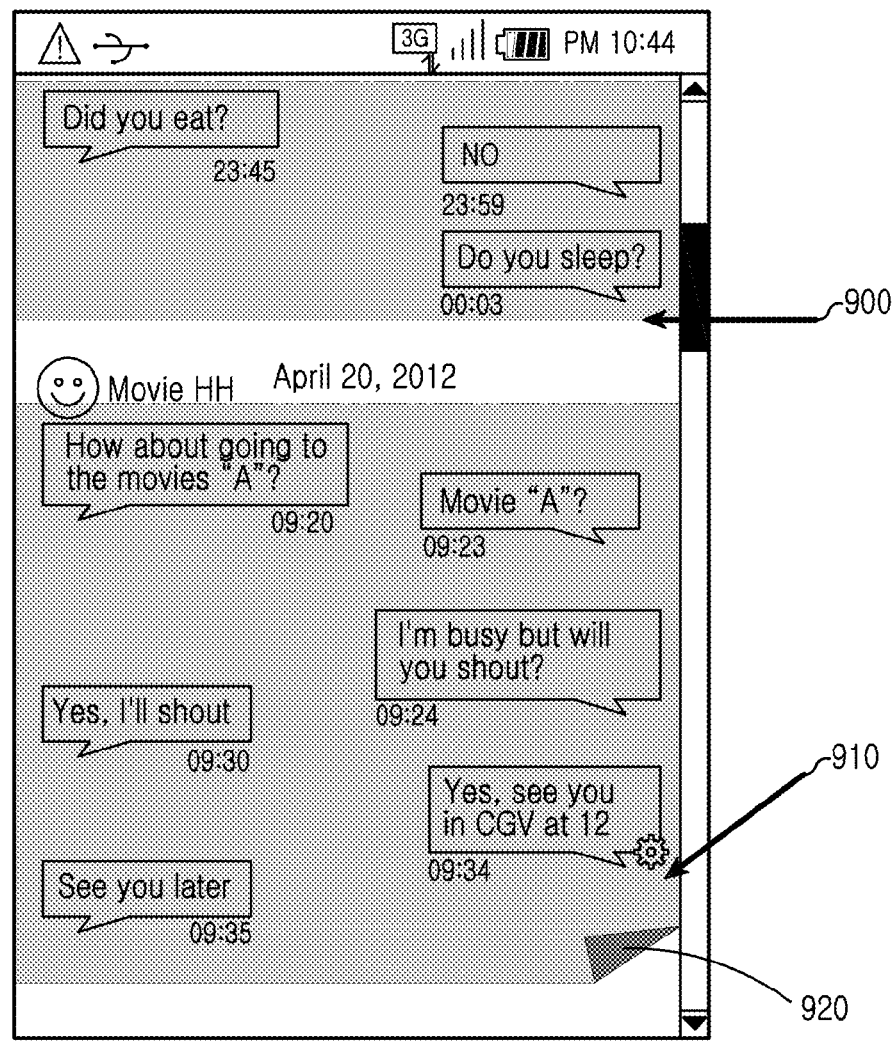
FIG. 9 shows dividing conversation messages inside a message window according to invention principles.
Figure 10:
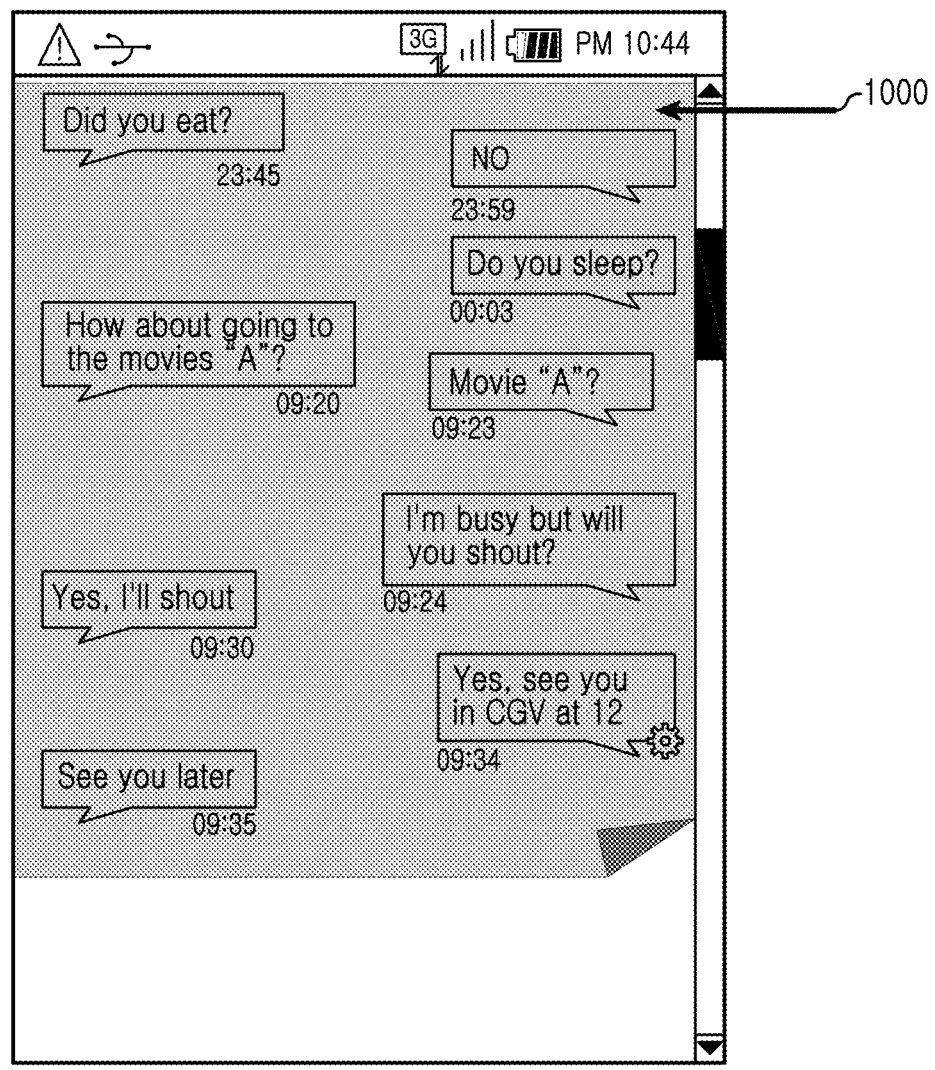
FIG. 10 shows merging divided conversation messages inside a message window according to invention principles.
Figure 11:
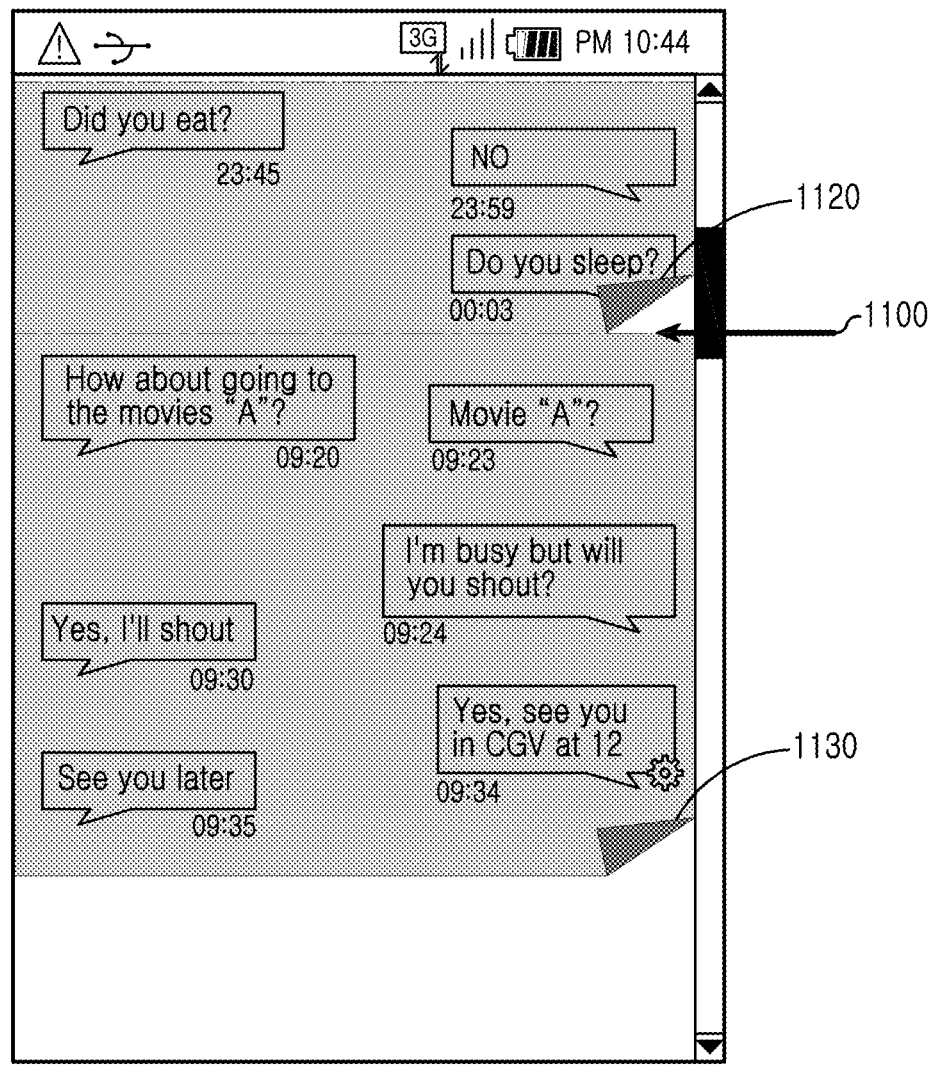
FIG. 11 shows separating divided conversation messages inside a message window according to invention principles.

FIG. 9 shows dividing conversation messages inside a message window. The system enables a user to employ a timer and adapt a displayed page for individual conversation messages (900). A page automatically extends in length for long messages. A page is automatically divided to allow a user to recognize it (910) where additional transmitted/received content does not exist for a specific user selected time period. A user is able to separate pages using draggable corner 920. FIG. 10 shows merging divided conversation messages inside a message window where the divided pages 900 and 910 of FIG. 9 are merged by a user (1000). FIG. 11 shows separating divided conversation messages inside a message window providing a user interface separating one page for separation (1100) or partial transmission is provided (1120, 1130).

Figure 12:
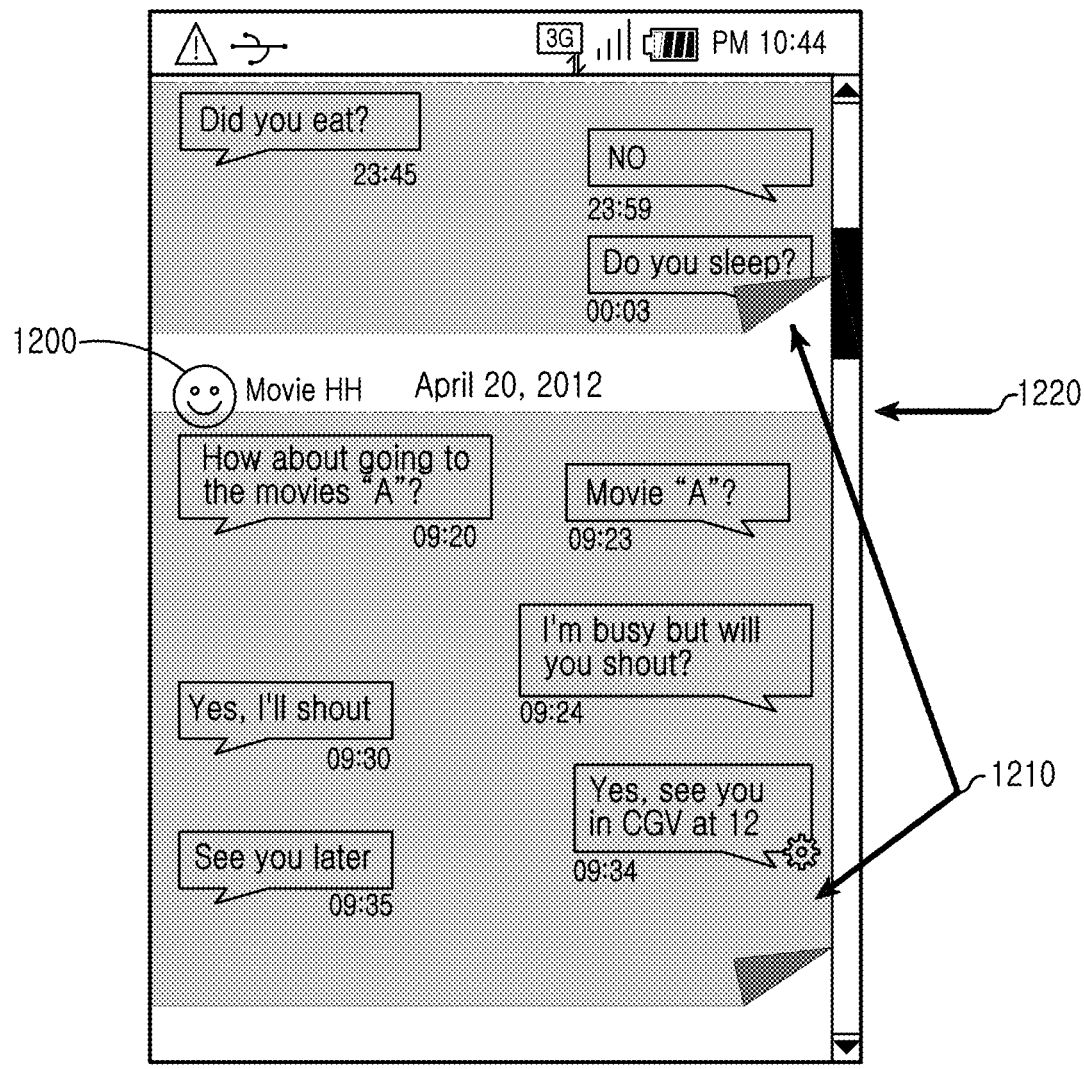
FIG. 12 shows transmitting divided conversation messages inside a message window according to invention principles.

FIG. 12 shows transmitting divided conversation messages inside a message window. A user touches (1200) an icon or a subject keyword of a specific subject partition area to transmit a message and inform a counterpart user of important content. In addition, a user initiates a gesture of turning over a page of a folded type e.g. page 1210, to transmit relevant conversation content of a folded division portion as if the area 120 is partitioned along a fold.

Figure 13:
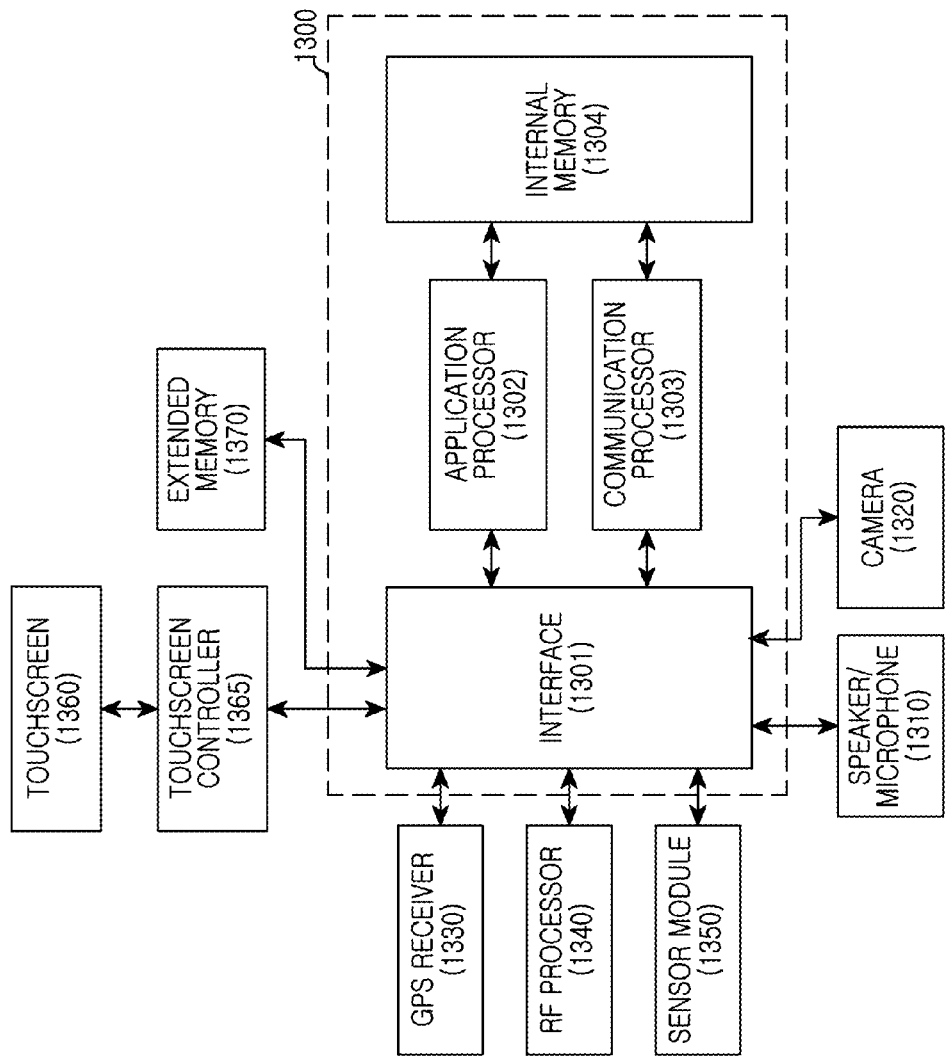
FIG. 13 shows construction of an electronic device according to invention principles.

FIG. 13 shows a portable electronic device such as a portable terminal, a mobile phone, a mobile pad, a media player, a tablet computer, a handheld computer, or a Personal Digital Assistant (PDA). The electronic device may combine two or more functions of these devices. The electronic device includes a controller 1300, a speaker/microphone 1310, a camera 1320, a GPS receiver 1330, an RF processor 1340, a sensor module 1350, a touchscreen 1360, a touchscreen controller 1365, and an extended memory 1370. The controller 1300 (processor) includes an interface 1301, one or more processors 1302 and 1303, and an internal memory 1304. The interface 1301, the application processor 1302, the communication processor 1303, and the internal memory 1304 may be separate elements or integrated in one or more integrated circuits.

The application processor 1302 executes software programs to perform various functions for the electronic device, and the communication processor 1303 controls voice communication and data communication. The processors 1302 and 1303 execute a specific software module (instruction set) stored in the extended memory 1370 or the internal memory 1304 to perform various specific functions corresponding to the module. Processors 1302 and 1303 perform message management and message transmission in cooperation with software modules stored in the extended memory 1370 or the internal memory 1304. To message content for each date, the application processor 1302 detects a touch of a date category via a user gesture and detects scroll by a second touch as illustrated in FIG. 2A. In addition, when a finger corresponding to a touch is separated from the touchscreen 1360, the application processor 1302 identifies an object of a first touch destination to store compressed content for conversation content of a relevant date and displays the relevant conversation messages in an overlapping form as illustrated in FIG. 2B (220). Alternatively, the application processor 1302 displays conversation messages of the relevant date as compressed data via a compressed icon (230). In compressing a list for each date, a scroll operation is performed and shape representing compression is concurrently shown in real-time as illustrated in FIG. 2B.

In order to manage conversation content for each specific subject, the application processor 1302 detects a touch for specific conversation content, detects a scroll up to a portion where the conversation content of the relevant subject ends, and when a finger corresponding to the touch is separated from the touchscreen 1360, compresses selected conversation messages as in FIG. 3. At this point, the application processor 1302 determines content of a conversation message to automatically insert titles corresponding to conversation subjects of various types such as a promise, a conference, a schedule, a gossip, for example, and corresponding icons as illustrated in FIG. 4. A subject of conversation content may be determined by a user or the system based on parsing text content and identifying subject keywords. Individual subject compression content is of lower priority in management than date. Further, compressed conversation message data is moved and separately managed.

A category is applied to compressed content and managed for each subject and date enabling compressed data management based on category. A date is selectable and scrolling is performable to a destination date for a conversation message to manage weekend messages, for example, as illustrated in FIG. 5. The application processor 1302 automatically transmits messages to a specific user or manually sets transmission destinations in response to a user setting. Alternatively, in case of conversation content with a plurality of specific destination users, the application processor 1302 detects a touch of the compression icon and when the touch is dragged to a virtually displayed point of equal division, transmits the conversation content. The application processor 1302 divides conversation messages into conversation message sections based on a database data including meaningful data such as a specific phrase and a word or a number, for example, defined by the user in advance. A message section is manually determined by a user.

Message content partitioned based on date and subject of a conversation message is movable to a specific subject group or an arbitrary position by a user (810). A user transmits/receives conversation messages of various contents to/from a counterpart user with a time difference as illustrated in FIG. 8. A message section is partitioned to include an icon input by the user for discriminating a specific subject or content representing specific meaning (830). A message section is represented using a division line together with an arbitrary icon or a character that may represent specific meaning (830). A user may select an arbitrary figure or a relevant message to store the conversation. A user may employ a scheduler and set start and end times of a period for message review and retrieval, or in the case where no transmitted/received conversation message exists for a specific time, in response to a screen sleep time. A page is configurable to be automatically partitioned and displayed in response to termination of an application.

In response to detection of a touch of an icon in an image partitioned by a specific subject or a keyword as illustrated in FIG. 12, messages corresponding to the specific subject are transmitted to a conversation counterpart user. Alternatively, conversation messages partitioned in a page form are transmitted to a relevant counterpart user together with an indication a relevant page is torn according to a user's gesture of turning over a page. Another processor (not shown) includes one or more data processors, image processors, or a codec. The data processors, image processors, and codec are configured separately. The interface 1301 connects the touchscreen controller 1365 of the electronic device to the extended memory 1370. The sensor module 1350 is coupled to the interface 1301 to enable various functions. For example, a movement sensor and a light sensor enable detection of movement of the electronic device and detection of light from the outside, respectively. Besides, other sensors such as a position measurement system, a temperature sensor or a living body sensor is connected to the interface 1301 to perform related functions. The camera 1320 is coupled to the sensor module 1350 via the interface 1301 to perform a camera function such as image acquisition, and video clip recording.

The Radio Frequency (RF) processor 1340 converts an RF signal to a baseband signal provided to the communication processor 1303 or converts a baseband signal from the communication processor 1303 to an RF signal for transmission under control of the communication processor 1303. The communication processor 1303 processes a baseband signal according to various communication schemes. For example, though not limited thereto, the communication scheme may include a Global System for Mobile Communication (GSM) communication scheme, an Enhanced Data GSM Environment (EDGE) communication scheme, a Code Division Multiple Access (CDMA) communication scheme, a Wide (W)-CDMA communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme and/or a Bluetooth communication scheme.

The speaker/microphone 1310 controls input and output of voice recording, voice duplication, digital recording, and an audio stream such as a telephone function. The speaker/microphone 1310 converts a voice signal to an electric signal or converts an electric signal to a voice signal. Though not shown, an attachable and detachable ear phone, a head phone, or a head set is connected to the electronic device via an external port. The speaker/microphone 1310 outputs an alarm signal depending on an alarm setting connected with content of a specific conversation message. The touch screen controller 1365 is coupled to the touchscreen 1360. The touch screen 1360 and the touchscreen controller 1365 detect contact and movement using capacitive, resistive, infrared and surface acoustic wave technologies for determining one or more contact points with the touchscreen 1360 but also an arbitrary multi-touch detection technology including other proximity sensor arrangements or other elements.

The touchscreen 1360 provides an input/output interface between an electronic device and a user. That is, the touchscreen 1360 transfers data identifying user touch input to the controller 1300. Also, the touchscreen 1360 shows an output from the electronic device to a user and shows a visual output to the user. This visual output is represented in the form of text, graphics, videos and a combination of these. For the touch screen 1360, various displays maybe used. For example, though not limited thereto, for the touchscreen 1360, a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED) or a Flexible LED (FLED) may be used.

The GPS receiver 1330 converts a signal received from a satellite to information such as a position, a speed or a time. For example, a distance between a satellite and the GPS receiver is calculated by multiplying the speed of light by a signal transfer time, and the exact positions and distances of three satellites are obtained, so that the position of the electronic device is measured according to a known triangulation principle. The extended memory 1370 or the internal memory 1304 includes a high speed random access memory such as one or more magnetic disk storage devices and/or a non-volatile memory, one or more optical storage devices and/or a flash memory (for example, NAND, NOR). The extended memory 1370 or the internal memory 1304 store software. A software element includes an Operating System (OS) software module, a communication software module, a graphics software module, a user interface software module, and an MPEG module, a camera software module, one or more application software modules, for example. Also, since a module which is a software element is expressed as a set of instructions, it is expressed as an instruction set. A module is also expressed as a program.

The OS software includes software elements for controlling the general system operation. The control of the system operation comprises memory management and control, storage hardware (device) control and management and power control and management, for example. The OS software also performs communication between various hardware (devices) and software elements (modules). The communication software module, which is not software per se, enables communication with another electronic device such as a computer, a server and/or a portable terminal, for example, via the RF processor 1340. Also, the communication software module is configured in a protocol structure corresponding to a relevant communication scheme. The graphics software module includes various software elements for providing and displaying graphics on the touchscreen 1360. A graphics terminology is used including text, a web page, an icon, a digital image, a video, an animation, for example. The user interface software module includes software elements related to a user interface. The user interface software module includes content regarding how the state of the user interface changes or under which condition the state of the user interface changes.

The camera software module includes a camera-related software element enabling camera-related processes and functions. An application module includes a browser, an e-mail, an instant message, word processing, keyboard emulation, an address book, a touch list, a widget, a Digital Right Management (DRM), voice recognition, voice duplication, a position determining function, a location based service, for example. The memories 1370 and 1304 may include an additional module (instructions) besides the above-described modules. Alternatively, a portion of a module (instructions) may not be used when needed.

Methods for managing a message and transmitting a message are shown in FIGS. 14 to 19. The system enables list configuration for each date by date and category in response to user gesture and detects a scroll corresponding to a second touch as illustrated in FIG. 2A when managing conversation message content for each date. In addition, when a finger corresponding to a touch is separated from the touchscreen 1360, the instruction identifies an object of a first touch destination and stores conversation content of a relevant date in the form of compressed content and displays the relevant conversation messages in an overlapping form as illustrated in FIG. 2B (220). Alternatively, the method displays the conversation messages of the relevant date as compressed data via a compression icon (230). The system compresses a list of messages for each date, a scroll operation is performed and concurrently a compression symbol is presented in real-time as illustrated in FIG. 2A.

The system determines content of a conversation message by text parsing and comparison with a database associating words with predetermined subject categories and associated titles and automatically inserts titles corresponding to conversation subjects of various types such as a promise, a conference, a schedule, gossip, for example, and associated icons as illustrated in FIG. 4. Depending on implementation, a subject of conversation content may be determined by a user input. Individual subject compression content may be subordinate to content of a date belonging to an upper concept thereto, and the compressed conversation message may be moved and separately managed.

An upper concept may be applied to contents compressed and managed for each subject and date, so that additional compression and management are possible. When a date is selected and scroll is performed up to a destination date with respect to conversation contents managed for each date as illustrated in FIG. 5, management on a weekend basis is possible. Management for each year may be possible in the same way. Also, in a method for expressing content of compression, a compression ratio of a maximum capacity set by a user may be expressed as illustrated in FIG. 6A, or in the case where the user performs divided compression, expression may be made as in FIG. 6B.

An instruction related to a method for transferring compressed content that utilizes a touch operation automatically transmits compressed content to one specific user or manually sets a transmission target user and transmits the compressed content to the target user depending on a user's setting in the case where a compression icon is touched as illustrated in FIG. 7. Also, in case of conversation content with a plurality of specific target users, a compression icon is touched and dragged to a virtually displayed point of equal division, the conversation content may be transmitted.

Though FIGS. 2 to 7 have described an example of compressing conversation messages, extraction of compressed conversation messages may be performed.

Also, an instruction for dividing and editing conversation messages inside a message window divides a conversation message section of conversation messages based on database data including meaningful data such as a specific phrase, a word, or a number, etc. defined by a user in advance. Depending on implementation, a message section may be manually determined by a user.

Message content partitioned by date or a specific subject within a partitioned message section or conversation message content of a message section partitioned by a user is movable to a specific subject group or an arbitrary position by the user (810).

The user transmits/receives various contents of a large amount of conversation messages to/from a counterpart user with a time difference as illustrated in FIG. 8. The message section may be divided to include an icon input by the user for division of a specific subject, or content representing specific meaning (830).

At this point, a division line is represented together with a character that may represent an arbitrary icon or specific meaning (830).

In the case where storing of only a specific conversation among conversation message content is needed, a user selects and stores an arbitrary figure or a relevant message. In another implementation, in case of storing a specific conversation message, a word frequently used in conversation content or a word set by a user is determined, transmitted/received conversation messages corresponding to a keyword are retrieved, conversation messages inside the neighborhood of a transmission/reception time may be selected with consideration of the transmission/reception time, and a user is asked whether to store the messages, and then the messages are stored.

Also, in the case where a repeated notice is required among content of a transmitted/received conversation message, the user sets an alarm setting with reference to the message content. At this point, an icon representing an alarm and content representing an alarm has been set are displayed on a relevant conversation message. In addition, the repeating period and frequency of an alarm may be set depending on user setting.

Depending on implementation, when a conversation message to utilize as an alarm and a notice is selected by a user, the message is automatically or manually added to an alarm application or a schedule application.

For another example, in the case where a work to do such as a schedule or a memo is required during transmission/reception of a conversation message, a user performs a memo function and displays content representing a memo.

For still another example, in the case where a retrieve function corresponding to a specific keyword or sentence is required during transmission/reception of a conversation message, a user performs a retrieve function using the specific keyword or sentence, and displays an icon representing the retrieve function or content representing the retrieve function is required. Retrieval may be immediately performed on data for retrieval during transmission/reception of a conversation message, and also the retrieve function may be utilized after the transmission/reception of a conversation message ends.

When a conversation message window is activated, a user operates a timer, and virtually sets a page whenever the user makes each page as illustrated in FIG. 9. In the case where a transmitted/received conversation between users exists, a virtual page extends its length and conversation is recorded. The start and end of the timer is determined by the user, or in the case where no transmitted/received conversation message exists for a specific time based on a screen sleep timing of the system or in the case where an application ends, a page is automatically divided and displayed.

Pages divided as illustrated in FIG. 9 may be merged as illustrated in FIG. 10, and on the contrary, one page may be separated into a plurality of pages as illustrated in FIG. 11.

When detecting a touch for an icon divided by a specific subject or a keyword as illustrated in FIG. 12, an instruction related to a method for transmitting conversation messages immediately transmits messages corresponding to the specific subject to a conversation counterpart user. Alternatively, the instruction transmits conversation messages divided in a page form to a relevant counterpart together with an effect that the relevant page is torn according to a user's gesture of turning over a page.

Figure 14:
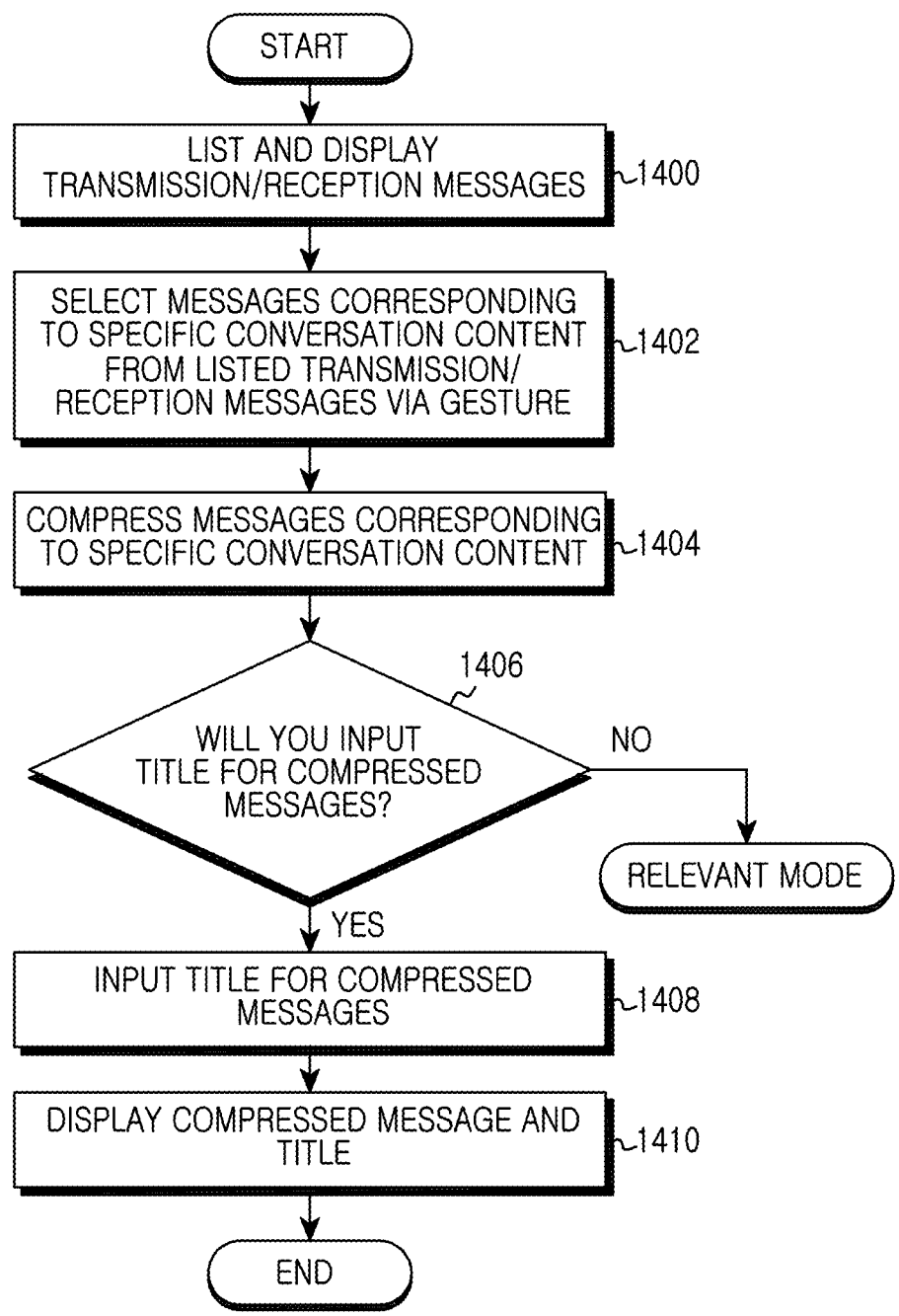
FIG. 14 shows a flowchart of a method for managing a message according to invention principles.

FIG. 14 shows a flowchart of a method for managing a message. An electronic device displays lists and displays transmitted/received conversation messages in step 1400, and selects messages corresponding to specific conversation content from the listed transmitted/received messages via a user gesture (multi-contact touch) in step 1402 (see FIG. 2A and FIG. 3). The specific conversation content may comprise transmitted/received messages for each date or transmitted/received conversation messages for each subject. The electronic device compresses the selected messages corresponding to the specific conversation content using a relevant compression algorithm in step 1404. A title requested for a compressed conversation message in step 1406, is received in step 1408 and the compressed conversation message is displayed with the title in step 1410 (FIG. 2B and FIG. 4). Messages corresponding to selected specific conversation content are displayed in an overlapping form or in the form of a compressed icon.

In contrast, when the title is not input with respect to the compressed conversation message, the electronic device in a relevant mode automatically derives a title determined using the selected specific conversation content and the method terminates.

Figure 15:
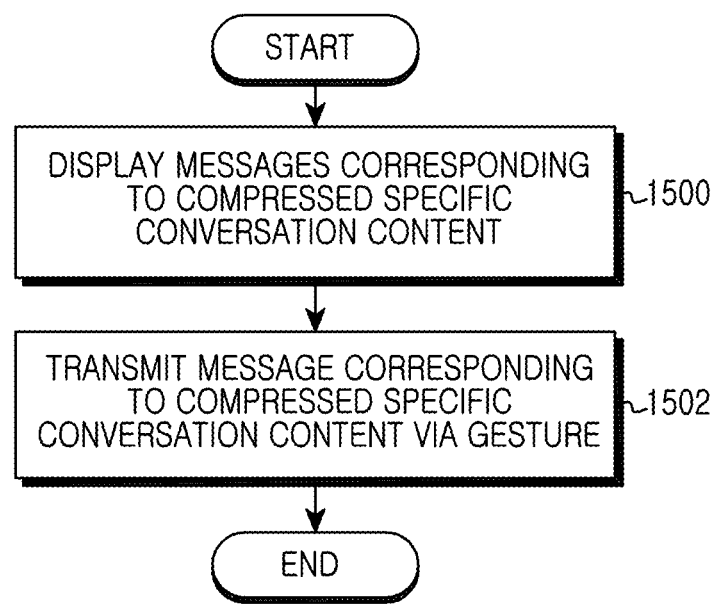
FIG. 15 shows a flowchart of a method for transmitting a message according to invention principles.

FIG. 15 shows a flowchart of a method for transmitting a message where the electronic device displays messages corresponding to compressed specific conversation content as illustrated in FIG. 4 in step 1500, and when detecting a user gesture (a touch or a double tap) in step 1502, transmits messages corresponding to relevant compressed specific conversation content to a specific counterpart user or a plurality of specific counterpart users (FIG. 7). For example, when detecting a touch for an icon (referred to as a compression icon, hereinafter) corresponding to compressed messages, the electronic device transmits messages of specific conversation content corresponding to the compression icon to a counterpart user. Messages are transmitted in a compressed state or are transmitted in a non-compressed state and the method terminates.

Figure 16:
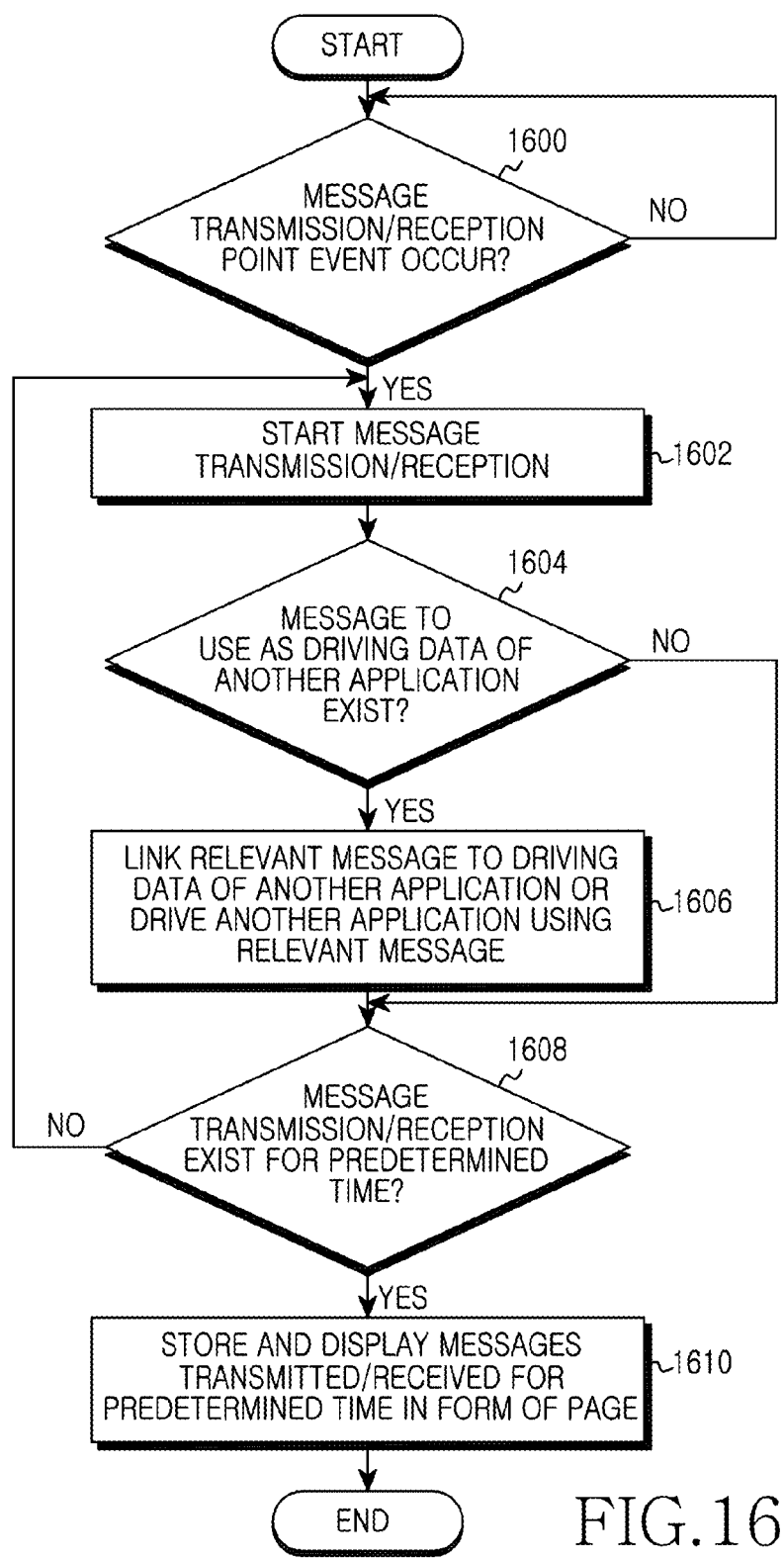
FIG. 16 shows a flowchart of a method for managing a message according to invention principles.

FIG. 16 shows a flowchart of a method for managing a message. In response to a transmission/reception start event of a message occurring in step 1600, an electronic device in step 1602 starts message transmission/reception. The electronic device determines whether to use a portion or entire content of a transmitted/received message as management data (an alarm point, a retrieve keyword, for example) to be provided to another application in step 1604. In step 1606 the device links a relevant message to the data provided to the application or initiates execution of a further application using the relevant message.

In response to a determination not to use a portion or entire content of the transmitted/received message as data for use by another application, the electronic device in step 1608 determines whether message transmission/reception occurs within a predetermined time. If message transmission/reception occurs within the predetermined time, the electronic device in step 1610 stores and displays transmitted/received messages in the form of a page covering a predetermined time or from a time period starting at transmission/reception time of a message. If no message transmission/reception occurs during the predetermined time, the electronic device returns to step 1602.

Figure 17:
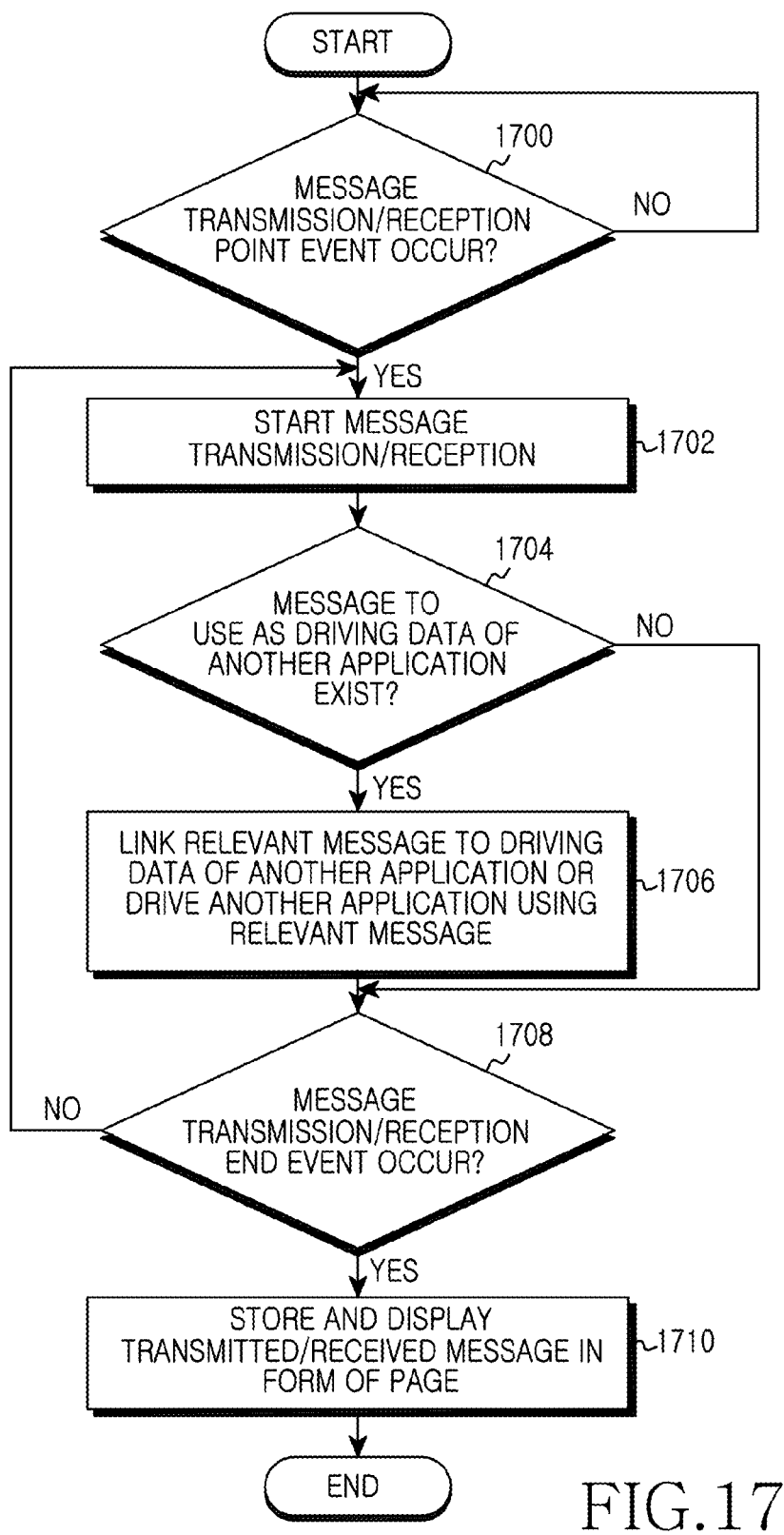
FIG. 17 shows a flowchart of a method for managing a message according to invention principles.

FIG. 17 shows a flowchart of a method for managing a message. In response to a transmission/reception start event in step 1700, an electronic device in step 1702 initiates transmission/reception of a message. The device determines whether to use a portion or entire content of a transmitted/received message as application data (a portion such as an alarm setting, a keyword, for example) for use by an application in step 1704. If it is determined to use the content, the electronic device in step 1706 links a relevant message to the application data provided to the application or initiates execution of the application using the relevant message. In response to a determination not to use a portion or entire content of the transmitted/received message as application data, the electronic device in step 1708 determines whether a message transmission/reception event ends. When the transmission/reception event ends, the electronic device in step 1710 stores and displays transmitted/received messages from a transmission/reception event start point to an end point in the form of a page. If a transmission/reception event does not end, the electronic device returns to step 1702.

Figure 18:
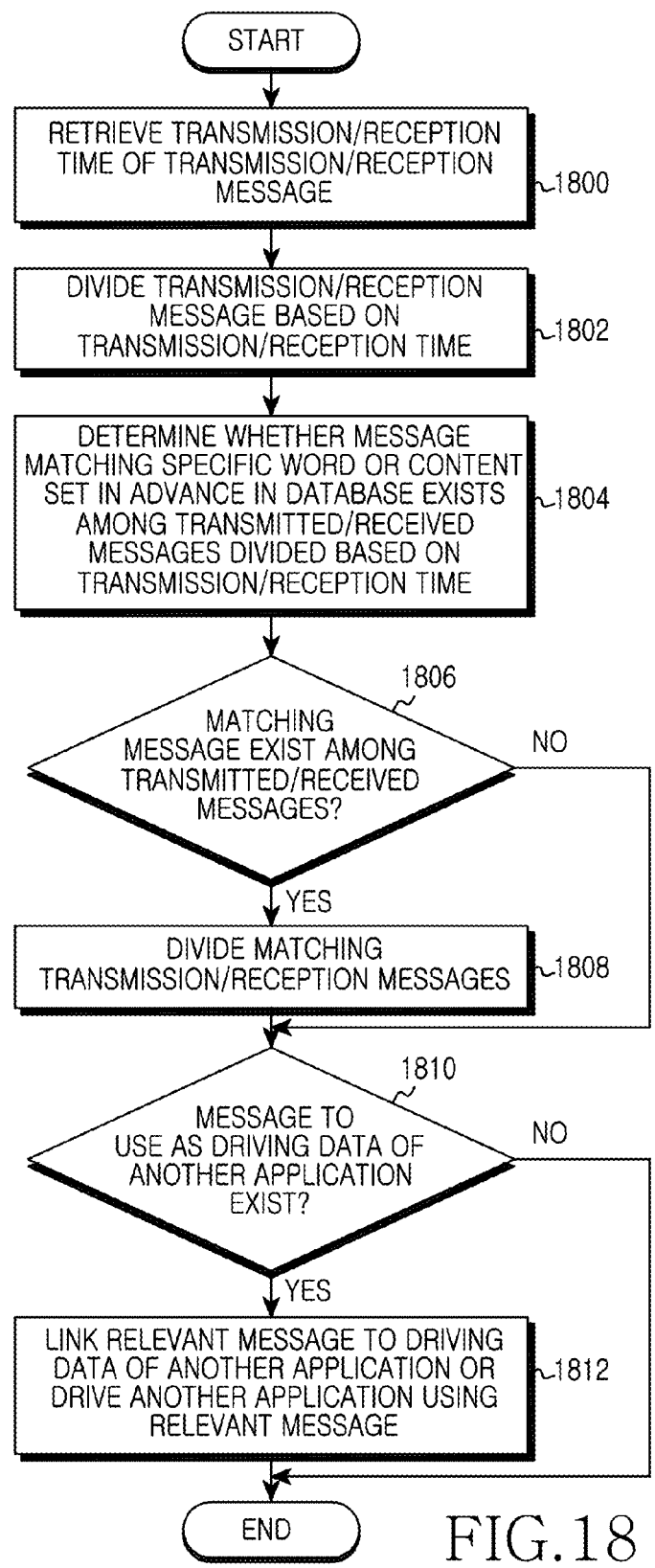
FIG. 18 shows a flowchart of a method for managing a message according to invention principles.

FIG. 18 shows a flowchart of a method for managing a message by retrieving a transmission/reception time of a message in step 1800 and classifying messages based on a transmission/reception point in step 1802. The electronic device determines whether a transmitted/received message matches a predetermined specific word or content in a database. If a matching transmission/reception message is identified, the electronic device in step 1808 divides matching transmission/reception messages based on a transmission/reception time. Messages transmitted/received before/after a transmission/reception time of a specific transmission/reception message are allocated to a first group, for example. If a matching transmission/reception message is not identified, the electronic device in step 1810 determines whether to use a portion or entire content of a transmitted/received message as input data to an application (such as an alarm setting, a keyword, for example). The electronic device in step 1812 links a relevant message to application input data or initiates execution of another application using the relevant message and the method of FIG. 18 terminates. The system enables a user to determine a message division line for a specific message subject from a plurality of transmission/reception messages.

Figure 19:
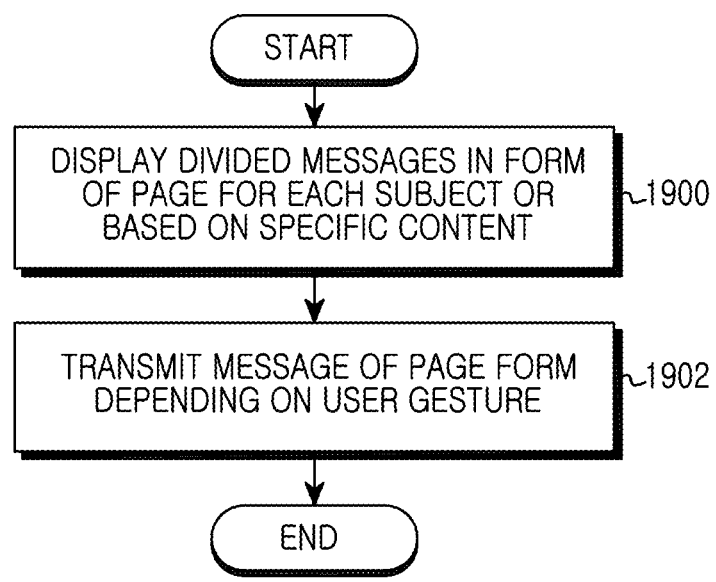
FIG. 19 shows a flowchart of a method for transmitting a message according to invention principles.

FIG. 19 shows a flowchart for processing a message by displaying messages corresponding to conversation content in the form of a page as illustrated in FIG. 12 in step 1900. In response to detecting a user gesture (a gesture of turning over a page) in step 1902, the electronic device transmits messages corresponding to specific conversation content included in a relevant page to a specific counterpart user or a plurality of specific counterpart users. Alternatively, displayed messages partitioned by a division line have a displayed icon associated with a partitioned region or content of a partitioned message. In response to detection of an icon touch corresponding to the division line, the electronic device transmits partitioned messages to a specific counterpart user or a plurality of specific counterpart users and the process of FIG. 19 terminates.

The system advantageously facilitates transmission of specific conversation message content by compressing and managing transmitted/received messages based on a specific subject and date using a multi-touch function, and transmitting selected compressed messages to a destination designated in advance or a receiver selected according to user request. The system advantageously provides a user friendly, intuitive interface for selecting content of a first touched portion for compression and facilitates compression and management of a large amount of data. In addition, the system facilitates managing e-mail and other electronic documents as well as transmitted/received messages for each individual group and processing a selected conversation message for distribution to executable applications. The system also provides a message specific memo and notice function associated with an individual message characteristic enabling message content to be used as alarm data.

Although the invention has been shown and described with reference to certain exemplary embodiments thereof, it will be understood by those skilled in the art that various changes in form and details is made therein without departing from the spirit and scope of the invention as defined by the appended claims and their equivalents. Therefore, the scope of the present invention is not limited to the above-described embodiments but should be determined by not only the appended claims but also the equivalents thereof.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

In addition, an artisan understands and appreciates that a "processor" or "microprocessor" constitute hardware in the claimed disclosure. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

What is claimed is:

1. A method usable by an electronic device, the method comprising:
    displaying content of a plurality of transmitted and received conversation messages for a first date, sequentially sorted by date and time, wherein the messages for the first date comprise a particular message, one or more messages following the particular message, and one or more messages preceding the particular message;
    detecting a first touch on a touch screen of the particular message;
    detecting a second touch on the touch screen;
    responsive to the second detected touch, wherein the second touch comprises a swipe immediately preceding a release of the second touch, scrolling messages for a second date onto the screen, wherein the scrolling of the message is performed concurrently with the swipe;
    in response to the release of the second touch following the swipe:
        compressing the particular message and the one or more messages following the particular message for the first date;
    compressing the scrolled messages for the second date separately from the first date,
    wherein compressing the messages comprises stacking the particular message and the one or more messages following the particular message for the first date;
    displaying the one or more messages preceding the particular message for the first date;
    displaying a first image element representing the compressed particular message and the one or more message following the particular message for the first date; and
    displaying a second image element representing the compressed scrolled messages for the second date.

2. The method of claim 1, including
    displaying the first and the second image element wherein:
    the content of a plurality of transmitted and received conversation messages concern a single subject.

3. The method of claim 1, wherein detecting the second touch on the touch screen comprises:
    detecting the second touch of an object corresponding to the second date.

4. The method of claim 3, further comprising:
    retrieving the object corresponding to the second date via scrolling in response to the second touch.

5. The method of claim 3, wherein compressing the compressing the scrolled messages for the second date comprises:
    compressing conversation messages for each date between the particular message for the first date and the object corresponding to the second date.

6. The method of claim 1, wherein the particular message and the at least one following messages for the first date are represented by overlapped image elements wherein a top-most one of the overlapped image elements is the particular one of the messages for the first date and wherein the compressed messages for the second date are represented by an icon.

7. The method of claim 1, further comprising:
displaying information regarding the compressed particular message and the at least one following messages for the first date and the compressed scrolled messages for the second date.

8. The method of claim 7, wherein the information regarding the compressed particular message and the at least one following messages for the first date and the compressed scrolled messages for the second date comprises one of a specific date, a transmission or reception time of a message, a portion of content or entire content of a first message and a title input by a user.

9. An electronic device comprising:
a touchscreen;
one or more processors;
a non-transitory memory; and
one or more programs stored in the memory and configured for execution by the one or more processors,
wherein the program comprises instructions executable for,
listing and displaying content of a plurality of transmitted and received conversation messages for a first date sorted by date and time, wherein the message for the first date comprise a particular message, one or more messages following the particular message, and one or more messages preceding the particular message, detecting a first touch on a touch screen of the particular message, detecting a second touch on the touch screen, responsive to the second detected touch, wherein the second touch comprises a swipe immediately preceding a release of the second touch, scrolling messages for a second date onto the screen, wherein the scrolling of the message is performed concurrently with the swipe,
in response to the release of the second touch following the swipe:
compressing the particular message and the one or more messages following the particular message for the first date;
compressing the scrolled messages for the second date separately from the first date,
wherein compressing the message comprises stacking the particular message and the one or more messages following the particular message for the first date;
displaying the one or more messages preceding the particular message;
displaying a first image element representing the compressed particular message and the one or more message following the particular message for the first date; and
displaying a second image element representing the compressed scrolled messages for the second date.

10. The electronic device of claim 9, wherein the instructions comprise instructions displaying the first and second image element wherein the content of a plurality of transmitted and received conversation messages concern a single subject.

11. The electronic device of claim 9, wherein the instruction for detecting the second touch comprises: at least one instruction for
detecting the second touch of an object corresponding to the second date.

12. The electronic device of claim 11, further comprising:
at least one instruction for retrieving an object corresponding to the second date via scrolling in response to the second touch.

13. The electronic device of claim 11, wherein the instructions for compressing the scrolled message for the second date comprises:
at least one instruction for compressing conversation messages for each date between the particular message for the first date and the object corresponding to the second date.

14. The electronic device of claim 9, wherein particular message and the at least one following messages for the first date are represented by overlapped image elements wherein a top-most one of the overlapped image elements is the particular one of the messages for the first date and wherein the compressed messages for the second date are represented by an icon.

15. The electronic device of claim 9, further comprising:
an instruction for displaying information regarding the compressed particular message and the at least one following messages for the first date and the compressed messages for the second date.

16. The electronic device of claim 15, wherein the information regarding the compressed particular message and the at least one following messages for the first date and the compressed messages for the second date comprises one of a specific date, a transmission or reception time of a message, a portion of content or entire content of a first message of the compressed messages, and a title input by a user.

* * * * *